(12) United States Patent
Kai

(10) Patent No.: US 6,873,378 B2
(45) Date of Patent: Mar. 29, 2005

(54) LIQUID CRYSTAL DISPLAY PANEL

(75) Inventor: Tsutomu Kai, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 10/267,613

(22) Filed: Oct. 9, 2002

(65) Prior Publication Data

US 2003/0128306 A1 Jul. 10, 2003

(30) Foreign Application Priority Data

Jan. 4, 2002 (JP) ........................................ 2002-000149

(51) Int. Cl.[7] .............................................. G02F 1/1343
(52) U.S. Cl. ............................................. 349/38; 349/39
(58) Field of Search ........................ 349/38, 39; 257/59, 257/72

(56) References Cited

U.S. PATENT DOCUMENTS 5,734,450 A * 3/1998 Irie et al. ....................... 349/39
5,748,266 A * 5/1998 Kodate ........................... 349/39
5,936,686 A * 8/1999 Okumura et al. .............. 349/38

* cited by examiner

Primary Examiner—Toan Ton
(74) Attorney, Agent, or Firm—Greer, Burns & Crain, LTD

(57) ABSTRACT

A liquid crystal display panel of the active matrix drive type is disclosed. Each pixel is provided with an storage capacitor, wherein capacitors for stabilizing the voltage are added to the common storage capacitor bus line that applies a predetermined potential to the storage capacitor bus lines provided for each of the rows to absorb noise that mixes into the storage capacitor bus lines through parasitic capacitances, thereby to decrease fluctuation in the voltage of the storage capacitor bus lines and to prevent the occurrence of display unevenness and crosstalk. Capacitors Ccs for stabilizing the voltage are added to a common storage capacitor bus line (vertical Cs line) 5 that applies a predetermined potential (storage capacitor bus line voltage Vcs) to the storage capacitor bus lines (horizontal Cs lines) 4 provided for each of the rows to form a common side of the storage capacitors Cs formed in each of the pixels. The capacitors Ccs are formed by utilizing the common storage capacitor bus line (vertical Cs line) 5. The capacitors Ccs may be formed in the MOS structure.

6 Claims, 12 Drawing Sheets

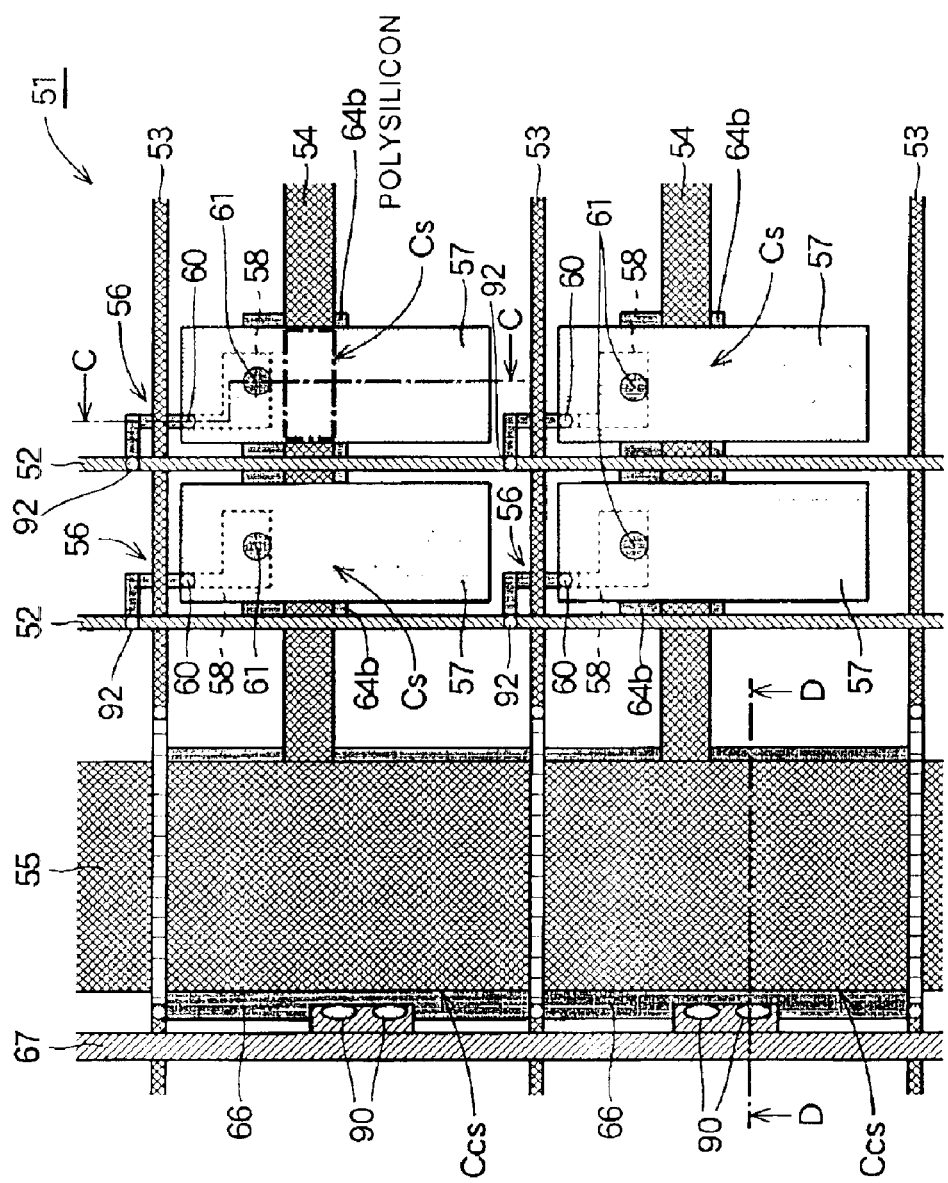

FIG.12

| DARK | BRIGHT | DARK | BRIGHT | DARK | BRIGHT | DARK | BRIGHT |
|------|--------|------|--------|------|--------|------|--------|
| BRIGHT | DARK | BRIGHT | DARK | BRIGHT | DARK | BRIGHT | DARK |
| DARK | BRIGHT | DARK | BRIGHT | DARK | BRIGHT | DARK | BRIGHT |
| BRIGHT | DARK | BRIGHT | DARK | BRIGHT | DARK | BRIGHT | DARK |
| DARK | BRIGHT | DARK | BRIGHT | DARK | BRIGHT | DARK | BRIGHT |
| BRIGHT | DARK | BRIGHT | DARK | BRIGHT | DARK | BRIGHT | DARK |
| DARK | BRIGHT | DARK | BRIGHT | DARK | BRIGHT | DARK | BRIGHT |
| BRIGHT | DARK | BRIGHT | DARK | BRIGHT | DARK | BRIGHT | DARK |

LIQUID CRYSTAL DISPLAY PANEL

BACKGROUND OF THE INVENTION

1. Field of the Invention

This invention relates to a liquid crystal display panel of the type of active matrix drive in which every pixel has a storage capacitor.

2. Description of the Related Art

FIG. 9 is a diagram of an equivalent circuit of a conventional liquid crystal display panel, and FIG. 10 is a diagram of an equivalent circuit of a display pixel in the conventional liquid crystal display panel. In the conventional liquid crystal display panel 101, a plurality of data bus lines (signal lines) 102 are formed in parallel on one transparent glass substrate that is not shown, and a plurality of gate bus lines (scanning lines) 103 are formed thereon in an intersecting manner via an insulating film. Storage capacitor bus lines (for each of the rows) 104 are arranged in parallel with the gate bus lines 103, and a common storage capacitor bus line 105 is arranged at the ends on one side of the storage capacitor bus lines 104 in parallel with the data bus lines 102.

The storage capacitor bus lines 104 are each electrically connected to the common storage capacitor bus line 105. A predetermined potential is supplied from a storage capacitor bus line drive circuit (not shown) to the storage capacitor bus lines 104 through the common storage capacitor bus line 105.

Pixels are formed in the regions defined by the data bus lines 102 and the gate bus lines 103. Data drivers (signal line drive circuits) 106 and gate drivers (scanning line drive circuits) 107 are provided on the peripheral regions of the display region on one transparent glass substrate (not shown) on where the pixels are formed to drive the data bus lines 102 and the gate bus lines 103.

Referring to FIG. 10, a thin-film transistor (hereinafter abbreviated as TFT) 108 is formed near a point where the data bus line 102 and the gate bus line 103 intersect each other. The drain electrode D of the TFT 108 is connected to the data bus line 102, the gate electrode G of the TFT 108 is connected to the gate bus line 103, and the source electrode S of the TFT 108 is connected to a pixel electrode 109. A liquid crystal layer 111 is held between the pixel electrode 109 and an opposing electrode 110 thereby to form a liquid crystal capacitance Clc. A storage capacitor Cs is connected in parallel with the liquid crystal capacitance Clc. The storage capacitor Cs is formed between the pixel electrode 109 and the storage capacitor bus line 104. The opposing electrode 110 is formed on the other transparent glass substrate that is not shown. An opposing electrode voltage Vcom is applied to the opposing electrode 110.

In the conventional liquid crystal display panel of the active matrix drive type, by applying a signal voltage to each data bus line (signal line) 102, signal voltages of the pixels are applied to the liquid crystal capacitances Clc of a selected row in a state where one of the plurality of gate bus lines 103 is selected and a scanning signal is applied, so that the TFTs 108 connected to the selected gate bus line 103 are turned on. The liquid crystal capacitance Clc has such a small capacitance that it is not sufficient to hold the signal voltage. Therefore, the storage capacitor Cs is connected in parallel with the liquid crystal capacitance Clc, so that the voltage written into the pixel electrode will not fluctuate in one vertical period. Thus, brightness is prevented from changing in the vertical period to thereby prevent the occurrence of so-called flickering.

At the time when the gate bus line 103 is changed from on voltage greater than a gate threshold voltage of the TFT into off voltage lower than the gate threshold voltage of the TFT, the potential of the pixel electrode (liquid crystal capacitance) 109 fluctuates due to parasitic capacitance (Cgs) between the gate and the source of the TFT 108 and due to parasitic capacitance (Cgp) between the gate bus line 103 and the pixel electrode 109, often causing a fluctuation in the brightness in the panel and flickering. The effect, however, can be decreased by providing the storage capacitor Cs.

FIGS. 11A and 11B are diagrams showing a problem of the conventional liquid crystal display panel, wherein FIG. 11A is a diagram of an equivalent circuit illustrating the parasitic capacitances Ck formed at portions where the storage capacitor bus lines 104 intersect the data bus lines 102, and mixing of noise into the storage capacitor bus lines 104 through the parasitic capacitances Ck, and FIG. 11B is a diagram illustrating a change in the signal voltage of the data bus lines 102. FIG. 12 is a diagram concretely illustrating a display pattern in which a change in the voltage of the storage capacitor bus lines becomes a maximum.

As shown in FIGS. 11A and 11B, the storage capacitor bus lines 104 are arranged at right angles with the data bus lines 102 and, hence, parasitic capacitances Ck are formed at portions where the storage capacitor bus lines 104 intersect the data bus lines 102. Therefore, a change in the voltage of the data bus lines 102 is transmitted to the storage capacitor bus lines 104 via the parasitic capacitances Ck. As a result, noise mixes into the storage capacitor bus lines 104 causing the voltage of the storage capacitor bus lines 104 to fluctuate. The voltage of the pixel electrodes 109 fluctuates accompanying a fluctuation in the voltage of the storage capacitor bus lines 104, and there occurs display unevenness.

Though not shown in FIGS. 11A and 11B, the voltage of the storage capacitor bus lines 104 fluctuates like the above even due to a change in the signal voltage applied to the pixel electrodes 109 through the TFTs 108, often causing display unevenness.

In displaying a so-called checkered pattern in which "bright" and "dark" are alternately repeated for each of the pixels as shown in FIG. 12, in particular, the voltage greatly fluctuates on the storage capacitor bus lines 104, and display unevenness and the crosstalk become conspicuous.

When the checkered pattern shown in FIG. 12 is displayed by using the constitution in which the data drivers (signal line drive circuits) 106 alternately supply a positive signal and a negative signal as shown in FIG. 11A, noises mixing into the storage capacitor bus lines 104 through the parasitic capacitances Ck all become of the same phase since the voltages of the data bus lines 102 change all in the same direction, and a voltage fluctuation becomes the greatest on the storage capacitor bus lines 104.

SUMMARY OF THE INVENTION

This invention was accomplished in order to solve the above problem, and provides a liquid crystal display panel which is capable of reducing the voltage fluctuation on the storage capacitor bus lines and of preventing degradation in the quality of display.

Namely, this invention is concerned with a liquid crystal display panel comprising pixel regions arranged like a matrix on a substrate, storage capacitors formed in the pixel regions, storage capacitor bus lines connected to the plurality of the storage capacitors, a common storage capacitor bus line for applying a predetermined potential to the plurality of the storage capacitor bus lines, and auxiliary capacitors connected to the common storage capacitor bus line.

In the liquid crystal display panel of the invention, the auxiliary capacitors are formed by utilizing the common storage capacitor bus line. In the liquid crystal display panel of the invention, the storage capacitors and the auxiliary capacitors are formed in an MOS structure.

In the liquid crystal display panel of the invention, the storage capacitors are formed in an n-MOS structure, and the auxiliary capacitors are formed in a p-MOS structure. In the liquid crystal display panel of the invention, the storage capacitors are formed in a p-MOS structure, and the auxiliary capacitors are formed in an n-MOS structure.

In the liquid crystal display panel of the invention, auxiliary capacitors for stabilizing the voltage are added to the common storage capacitor bus line that applies a predetermined potential to the storage capacitor bus lines. Namely, the auxiliary capacitors for stabilizing the voltage absorb noises that are mixed into the storage capacitor bus lines via parasitic capacitances at portions where the data bus lines are intersecting the storage capacitor bus lines. Even when the voltage of the storage capacitor bus lines fluctuates accompanying the fluctuation of the signal voltage applied to the pixel electrodes, the fluctuation of the voltage can be absorbed by the auxiliary capacitors for stabilizing the voltage. This suppresses the fluctuation in the voltage of the storage capacitor bus lines and, hence, prevents the occurrence of display unevenness and the transverse crosstalk, making it possible to obtain a display of good quality.

When the storage capacitor of the pixel is formed in the MOS structure, the auxiliary capacitor for stabilizing the voltage that is added to the common storage capacitor bus line is formed in the MOS structure, too, to further increase the auxiliary capacitor for stabilizing the voltage and, hence, to effectively suppress the fluctuation in the voltage of the storage capacitor bus line. Further, when the storage capacitor in the pixel is formed in the n-MOS structure, the auxiliary capacitor for stabilizing the voltage is formed in the p-MOS structure and when the storage capacitor in the pixel is formed in the p-MOS structure, the capacitance for stabilizing the voltage is formed in the n-MOS structure, so that the voltage supplied to the common storage capacitor bus line is used as an off-voltage or an on-voltage for the gate bus lines. This eliminates the need of newly supplying a voltage, and the circuit constitution and the structure of the liquid crystal display panel can be simplified.

BRIEF DESCRIPTION OF THE DRAWINGS

FIG. 5 is a diagram of a wiring constitution of major portions in the liquid crystal display panel according to a second embodiment of the invention;

FIGS. 11A and 11B are diagrams showing a problem inherent in the conventional liquid crystal display panel, wherein FIG. 11A is a diagram of an equivalent circuit illustrating parasitic capacitances Ck formed at portions where the storage capacitor bus lines intersect the data bus lines (signal lines), and noises mixing into the storage capacitor bus lines through the parasitic capacitances Ck, and FIG. 11B is a diagram illustrating a change in the signal voltage of the data bus lines (signal lines); and FIG. 12 is a diagram illustrating the problem inherent in the conventional liquid crystal display panel, and concretely illustrating a display pattern in which voltage fluctuation becomes a maximum on the storage capacitor bus lines.

DESCRIPTION OF THE PREFERRED EMBODIMENTS

Figure 1:
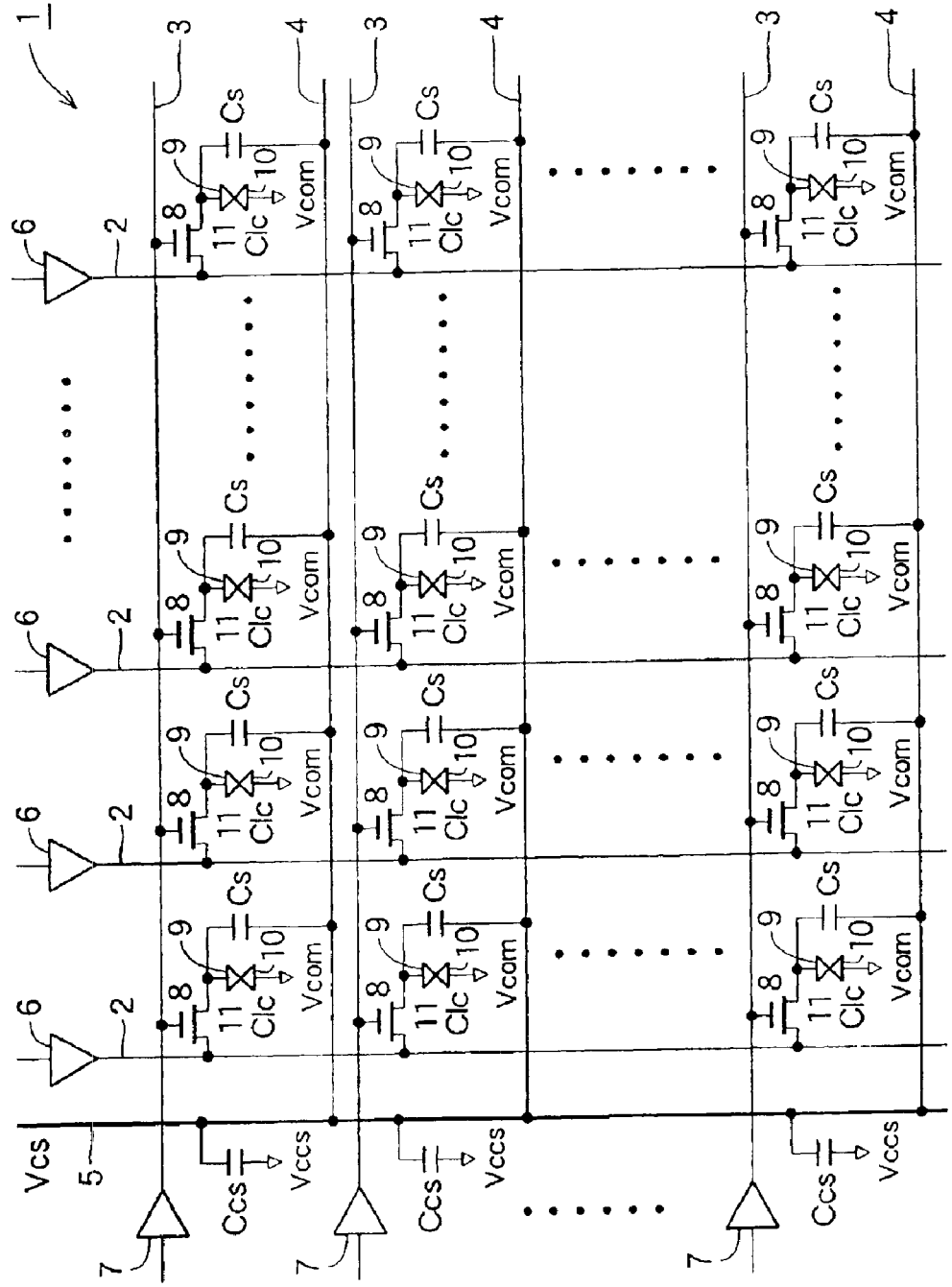
FIG. 1 is a diagram of an equivalent circuit of a liquid crystal display panel according to an embodiment of the invention.

A liquid crystal display panel according to an embodiment of the invention will now be described with reference to FIGS. 1 to 8. FIG. 1 is a diagram of an equivalent circuit of the liquid crystal display panel according to the embodiment. In the liquid crystal display panel 1 of this embodiment, a plurality of data bus lines (signal lines) 2 are formed in parallel on one transparent glass substrate that is not shown, and a plurality of gate bus lines (scanning lines) 3 are formed thereon in an intersecting manner via an insulating film that is not shown. A plurality of storage capacitor bus lines (storage capacitor bus lines for each of the rows: horizontal storage capacitor bus lines) 4 are arranged in parallel with the gate bus lines 3, and a common storage capacitor bus line 5 is arranged at the ends on one side of the storage capacitor bus lines 4 in parallel with the data bus lines 2. The storage capacitor bus lines (for each of the rows) 4 are electrically connected to the common storage capacitor bus line 5. A predetermined potential (storage capacitor bus line voltage Vcs) is supplied from a storage capacitor bus line drive circuit (not shown) to the storage capacitor bus lines (storage capacitor bus lines for each of the rows: horizontal storage capacitor bus lines) 4 through the common storage capacitor bus line (vertical storage capacitor bus line) 5.

Pixels are formed in the regions defined by the data bus lines 2 and by the gate bus lines 3. Data drivers (signal line drive circuits) 6 and gate drivers (scanning line drive circuits) 7 are provided on the peripheral regions of the display region on one transparent glass substrate (not shown) on where the pixels are formed to drive the data bus lines 2 and the gate bus lines 3.

Thin-film transistors (TFTs) 8 are formed near the points where the data bus lines 2 and the gate bus lines 3 intersect each other. The drain electrode D of the TFT 8 is connected to the data bus line 2, the gate electrode G of the TFT 8 is connected to the gate bus line 3, and the source electrode S of the TFT 8 is connected to a pixel electrode 9. A liquid crystal layer 11 is held between the pixel electrode 9 and an opposing electrode 10 thereby to form a liquid crystal capacitance Clc. A storage capacitor Cs is connected in parallel with the liquid crystal capacitance Clc. The storage capacitor Cs is formed between the pixel electrode 9 and the storage capacitor bus line 4. The opposing electrode 10 is formed on the other transparent glass substrate that is not shown. An opposing electrode voltage Vcom is supplied to the opposing electrode 10.

In the liquid crystal display panel 1 of this embodiment, further, auxiliary capacitors Ccs for stabilizing the voltage are connected to the common storage capacitor bus line (vertical storage capacitor bus line) 5. The auxiliary capacitors Ccs for stabilizing the voltage are provided for each of the horizontal storage capacitor bus lines of each of the rows. A predetermined potential (voltage on the side of common electrodes of the auxiliary capacitors for stabilizing voltage: Vccs) is applied to the ends on the other side (common side) of the auxiliary capacitors Ccs for stabilizing the voltage. As the predetermined potential (voltage on the side of common electrodes of the auxiliary capacitors for stabilizing voltage: Vccs), there can be used the ground potential or a potential which is higher than the storage capacitor bus line voltage Vcs by about 3 V. It is desired that the capacitance of the auxiliary capacitor Ccs for stabilizing the voltage is greater than the total capacitance of a row of storage capacitors Cs. To increase the capacitance of the auxiliary capacitor Ccs for stabilizing the voltage, however, a wide region is necessary for forming the auxiliary capacitor Ccs for stabilizing the voltage. Therefore, the capacitance of the auxiliary capacitor Ccs for stabilizing the voltage may be smaller than the total capacitance of the row of storage capacitors Cs.

In the liquid crystal display panel 1 of this embodiment, auxiliary capacitors Ccs for stabilizing the voltage are connected to the common storage capacitor bus line 5 to absorb noise that has mixed into the storage capacitor bus lines 4 and to stabilize the voltages of the storage capacitor bus lines 4. Upon stabilizing the voltages on the storage capacitor bus lines 4, voltage fluctuation on the pixel electrodes 9 decreases and, as a result, occurrence of crosstalk in the transverse direction is prevented on the display region.

Figure 2:
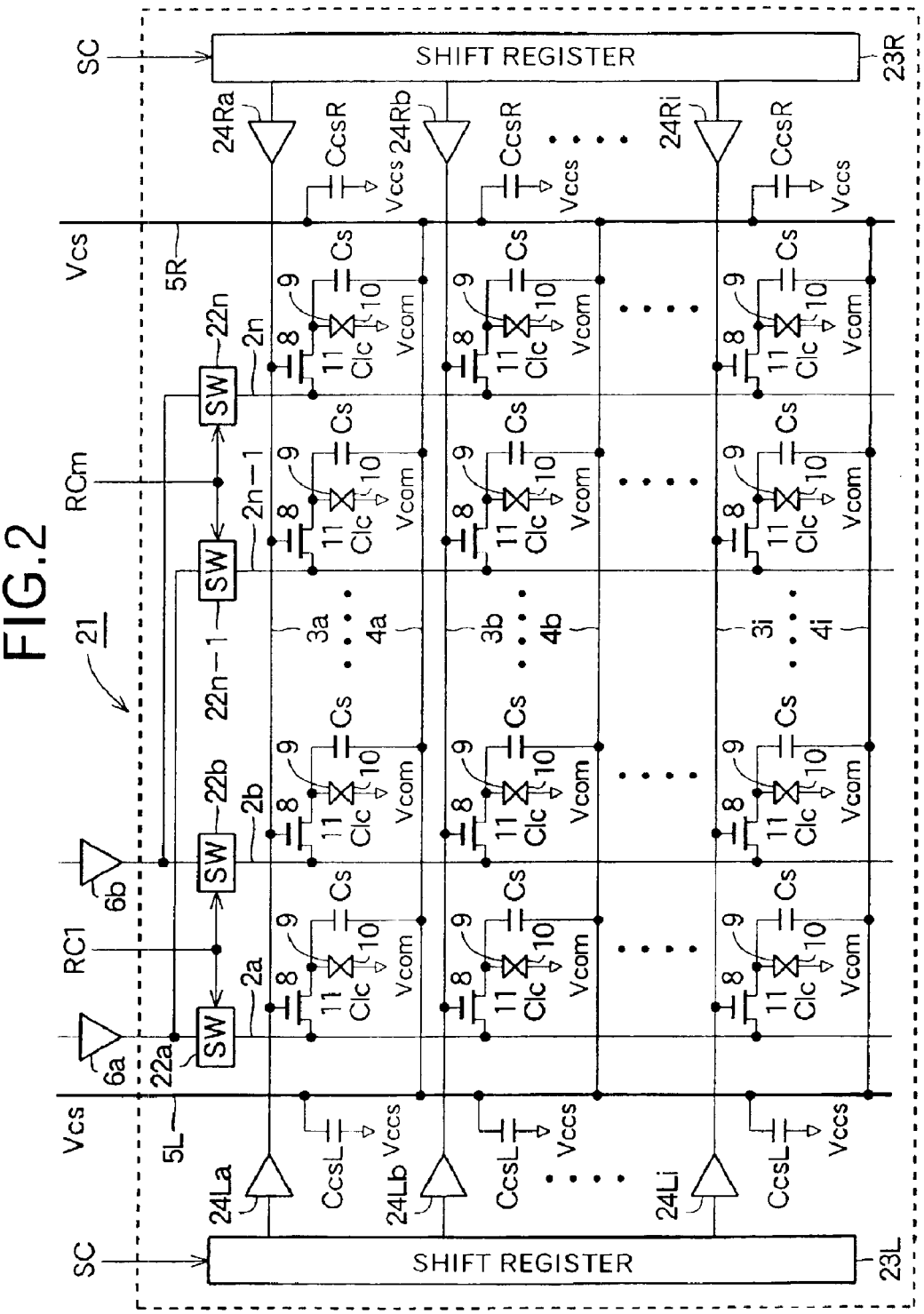
FIG. 2 is a diagram of an equivalent circuit of another liquid crystal display panel according to the embodiment of the invention.

FIG. 2 is a diagram of an equivalent circuit of another liquid crystal display panel according to the embodiment. The liquid crystal display panel 21 shown in FIG. 2 is fabricated by a process for producing polysilicon at low temperatures, and the constitution of a portion surrounded by a dotted line, except the opposing electrodes 10, is formed on one transparent glass substrate that is not shown. The liquid crystal display panel 21 includes a plurality of data bus lines 2a to 2n and a plurality of gate bus lines 3a to 3i formed intersecting each other via an insulating film on one transparent glass substrate that is not shown. Further, storage capacitor bus lines (storage capacitor bus lines for each of the rows: horizontal storage capacitor bus lines) 4a to 4i are formed in parallel with the gate bus lines 3a to 3i. On the right and left sides of the ends of the storage capacitor bus lines 4a to 4i, there are formed common storage capacitor bus lines 5L and 5R in parallel with the data bus lines 2a to 2n.

The storage capacitor bus lines 4 are electrically connected to the common storage capacitor bus lines 5L and 5R. A predetermined potential (storage capacitor bus line voltage Vcs) is applied from an storage capacitor bus line drive circuit that is not shown to the storage capacitor bus lines 4a to 4i through the right and left common storage capacitor bus lines (vertical storage capacitor bus lines) 5R and 5L. Auxiliary capacitors CcsL, CcsR for stabilizing the voltage are connected to the common storage capacitor bus lines 5L and 5R. The auxiliary capacitors CcsL, CcsR for stabilizing the voltage are provided for the storage capacitor bus lines 4a to 4i of each of the rows.

Pixels are formed in the regions defined by the data bus lines 2a to 2n and by the gate bus lines 3a to 3i. Analog switching circuits (SW) 22a to 22n are formed on the region on, for example, the upper side in the periphery of the display region where the pixels are formed on one transparent glass substrate that is not shown, the number of the analog switching circuits (SW) 22a to 22n being equal to the total number of the data bus lines 2a to 2n. On the right and left regions in the peripheries of the display region, there are provided a pair of shift registers 23R and 23L, as well as gate bus line buffer circuits 24Ra to 24Ri and 24La to 24Li of numbers equal to the total number of the gate bus lines 3a to 3i.

In the data drive circuit region provided on the outer periphery of the liquid crystal display panel 21, there are formed first and second data drivers (signal line drive circuits) 6a and 6b, as well as a data bus line selection control circuit (not shown) for forming and outputting data bus line selection control signals RC1 to RCm for controlling the selection of the data bus lines 2a to 2n for applying half-tone voltages output from the data drivers 6a and 6b.

The half-tone voltage output from the first data driver 6a is applied to the input terminals of the analog switching circuits 22a, - - -, 22n−1 of odd numbers. The half-tone voltage output from the second data driver 6b is applied to the input terminals of the analog switching circuits 22b, - - -, 22n of even numbers. The output terminal of the first analog switching circuit 22a is connected to the first data bus line 2a. Similarly, the output terminals of the second, - - - -, (n−1)th and n-th analog switching circuits 22b, - - -, 22n−1, 22n are connected to the second, - - - -, (n−1)th and n-th data bus lines 2b, - - -, 2n−1 and 2n. A first data bus line selection control signal RC1 is applied to the switching control terminals of the first and second analog switching circuits 22a and 22b. Similarly, m-th (m=n/2) data bus line selection control signal RCm is applied to the switching control terminals of the (n−1)th and n-th analog switching circuits 22n−1 and 22n.

Accordingly, when the first data bus line selection control signal RC1 is applied, the first and second analog switching circuits 22a and 22b are rendered conductive, the half-tone voltage output from the first data driver 6a is applied to the first data bus line 2a, and the half-tone voltage output from the second data driver 6b is applied to the second data bus line 2b. Similarly, hereinafter, when the m-th data bus line selection control signal RCm is applied, the (n−1)th and n-th analog switching circuits 22n−1 and 22n are rendered conductive, the half-tone voltage output from the first data driver 6a is applied to the (n−1) th data bus line 2n−1, and the half-tone voltage output from the second data driver 6b is applied to the n-th data bus line 2n.

Thus, analog switching circuits 22a to 22n are provided between the data drivers 6a, 6b and the data bus lines 2a to 2n to apply the half-tone voltage to the data bus lines 2a to 2n in a time-divisional manner while decreasing the number of the signal lines between the liquid crystal display panel 21 and the data drive circuit board provided on the outside of the liquid crystal display panel 21. Though FIG. 2 illustrates the constitution in which the half-tone voltage is applied to the two data bus lines simultaneously, it is also allowable to apply the half-tone voltage to three or more data bus lines simultaneously.

The shift registers 24L and 24R form vertical scanning signals (gate drive signals) based upon the vertical scanning control signal SC. The vertical scanning signals (gate drive signals) output from one shift register 24L are applied to the gate bus lines 3a to 3i through the gate buffer circuits 24La to 24Li. The vertical scanning signals (gate drive signals) output from the other shift register 24R are applied to the gate bus lines 3a to 3i through the gate buffer circuits 24Ra to 24Ri. The scanning signals are applied to one gate bus line 3 through both the right and left ends thereof, so that the scanning signals will not become dull even in a large liquid crystal display panel in which there are many pixels in the horizontal direction (transverse direction) and the gate bus lines are long.

Further, the pixels are formed in the regions defined by the data bus lines 2 and the gate bus lines 3. However, the pixels are constituted in the same manner as those of the liquid crystal display device 1 shown in FIG. 1, and are each provided with the thin-film transistor (TFT) 8, the liquid crystal capacitance Clc and the storage capacitor Cs.

In the liquid crystal display panel 21 shown in FIG. 2, a plurality of auxiliary capacitors CcsL, CcsR for stabilizing the voltage are connected to the common storage capacitor bus lines (vertical storage capacitor bus lines) 5L and 5R. The auxiliary capacitors CcsL, CcsR for stabilizing the voltage are provide for the horizontal storage capacitor bus lines of each of the rows. A predetermined potential (voltage on the side of the common electrodes of the auxiliary capacitors for stabilizing voltage: Vccs) is applied to the other ends (common side) of the auxiliary capacitors CcsL, CcsR for stabilizing the voltage. As the predetermined potential (voltage on the side of the common electrodes of the auxiliary capacitors for stabilizing voltage: Vccs), there can be used a ground potential or a potential which is higher than the storage capacitor bus line voltage Vcs by, for example, about 3 V.

In the liquid crystal display panel 21 shown in FIG. 2, the auxiliary capacitors CcsR, CcsL for stabilizing the voltage are connected to the right and left common storage capacitor bus lines 5R and 5L. Therefore, it is desired that the capacitances of the auxiliary capacitors CcsL and CcsR for stabilizing the voltage are not smaller than one-half the total capacitance of a row of the storage capacitors Cs. To increase the capacitances of the auxiliary capacitors CcsL, CcsR for stabilizing the voltage, however, a wide region is necessary for forming the auxiliary capacitors CcsL, CcsR for stabilizing the voltage. Therefore, the capacitances of the auxiliary capacitors CcsL, CcsR for stabilizing the voltage may be smaller than one-half the total capacitance of the row of the storage capacitors Cs.

In another liquid crystal display panel 21 of this embodiment shown in FIG. 2, auxiliary capacitors CcsL, CcsR for stabilizing the voltage are connected to the common storage capacitor bus lines 5L, 5R to absorb noise that has mixed into the storage capacitor bus lines 4a to 4i and to stabilize the voltages of the storage capacitor bus lines 4a to 4i. Upon stabilizing the voltages on the storage capacitor bus lines 4a to 4i, voltage fluctuation on the pixel electrodes 9 decreases and, as a result, occurrence of crosstalk in the transverse direction is prevented.

Figure 3:
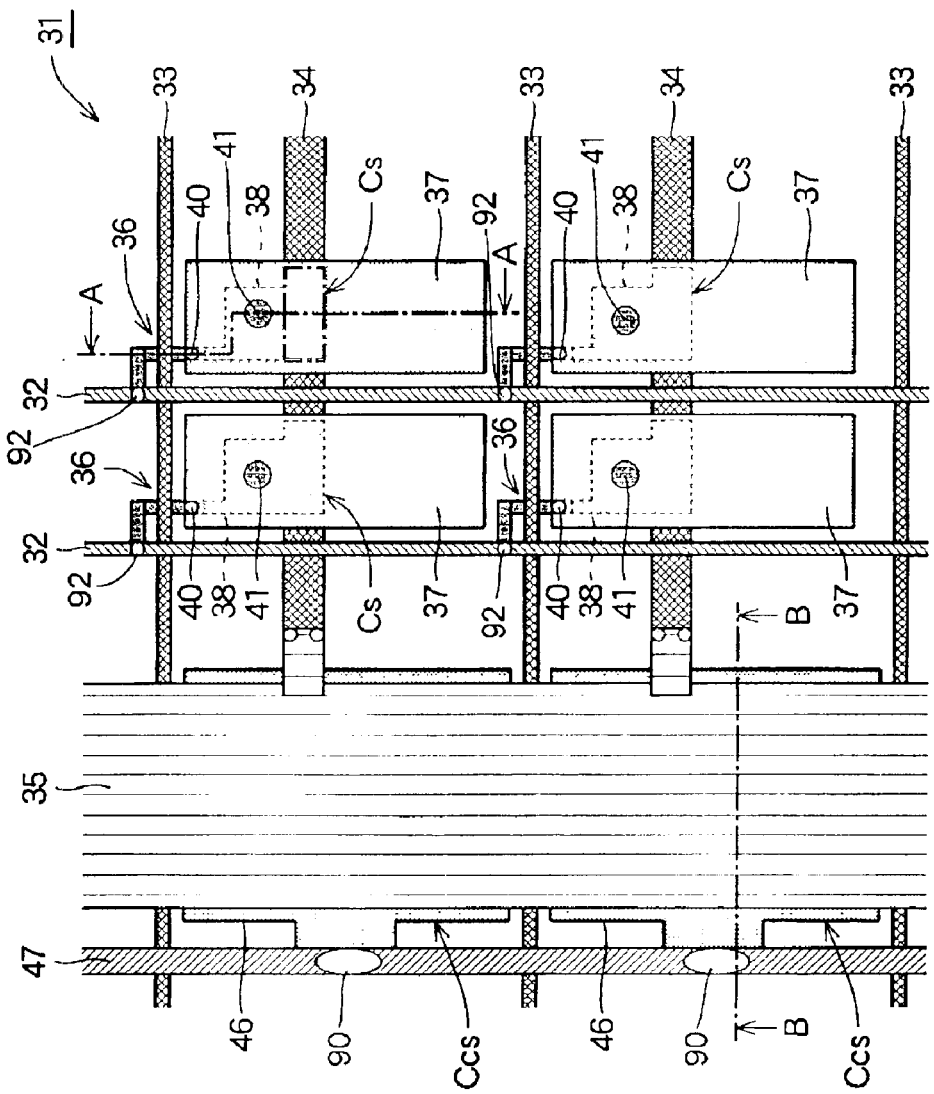
FIG. 3 is a diagram of a wiring constitution of major portions in the liquid crystal display panel according to the first embodiment of the invention.
Figure 4A:
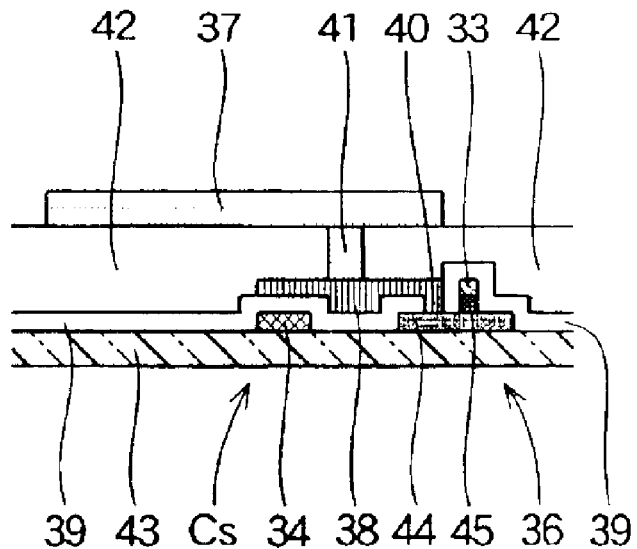
FIG. 4A is a sectional view of a pixel region (along the line A—A in FIG. 3)
Figure 4B:
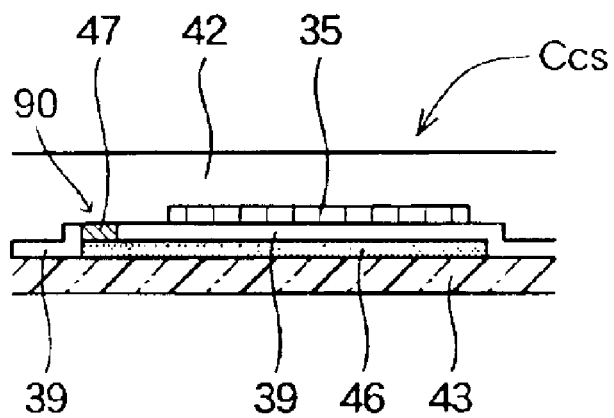
FIG. 4B is a sectional view of a capacitor portion (along the line B—B in FIG. 3) formed by utilizing a common storage capacitor bus line.

FIG. 3 is a diagram of a wiring constitution of major portions in the liquid crystal display panel according to the first embodiment, FIG. 4A is a sectional view of a pixel region (along the line A—A in FIG. 3), and FIG. 4B is a sectional view of a capacitor portion (along the line B—B in FIG. 3) formed by utilizing the common storage capacitor bus line.

In the liquid crystal display panel 31 according to the first embodiment as shown in FIG. 3, there are formed a plurality of gate bus lines 33 in parallel on the transparent glass substrate, and a plurality of data bus lines 32 intersecting thereto via an insulating film which is not shown. There are further formed a plurality of storage capacitor bus lines (horizontal Cs bus lines) 34 in parallel with the gate bus lines 33, and a common storage capacitor bus line (vertical Cs bus line) 35 in parallel with the data bus lines 32.

TFTs 36 are arranged at positions near the points where the gate bus lines 33 intersect the data bus lines 32. Pixel electrodes (transparent electrodes) 37 are arranged on the regions defined by the gate bus lines 33 and the data bus lines 32. The drain electrodes of the TFTs 36 are connected to the data bus lines 32, and the source electrodes of the TFTs 36 are connected to the data layers 38 and are further connected to the pixel electrodes (transparent electrodes) 37 through the data layers 38. The data layer 38 is extending up to a position where it is opposed to the storage capacitor bus line (horizontal Cs bus line) 34. Referring to FIG. 4A, the storage capacitor bus line 34 and the data layer 38 are opposed to each other via a first interlayer film 39 thereby to form an storage capacitor Cs for each of the pixels. In FIG. 3, a region where the storage capacitor Cs is formed is surrounded by a dot-dash chain line. The region where the storage capacitor Cs is formed as surrounded by the dot-dash chain line is shown concerning a particular pixel only.

In FIG. 3, a source region of a polysilicon layer 44 is connected to the source electrode of the TFT 36 through a contact hole 40 formed in the first interlayer film 39 (see FIG. 4A). Further, the data layer 38 is connected to the pixel electrode (transparent electrode) 37 through a contact hole 41 formed in a second interlayer film 42 (see FIG. 4A). The polysilicon layer 44 extending up to under the data bus line 32 is connected to the data bus line 32 through a contact hole 92 formed in the first interlayer film 39.

Referring to FIG. 4A, the pixel region is formed as described below. First, the polysilicon layer 44 is formed on the transparent glass substrate 43. Then, an oxide film 45 is formed on the polysilicon layer 44. Thereafter, the gate bus line (gate layer) 33 and the storage capacitor bus line 34 are formed on the oxide film 45. Next, the first interlayer film 39 is formed on the gate bus line (gate layer) 33 and on the storage capacitor bus line 34. Then, the first interlayer film 39 on the polysilicon layer 44 is opened to form the contact hole 40. Then, the data layer 38 and the source electrode of the TFT 36 are formed on the first interlayer film 39. The data layer 38 is formed on a region from the source electrode of the TFT 36 up to the storage capacitor bus line 34. The storage capacitor bus line 34 and the data layer 38 are opposed to each other via the first interlayer film 39 to form the storage capacitor Cs. Then, the second interlayer film 42 is formed on the data layer 38 and on the first interlayer film 39, and the second interlayer film 42 on the data layer 38 is opened to form the contact hole 41. The pixel electrode 37 is then formed on the second interlayer film 42.

A transparent glass substrate (not shown) equipped with an opposing electrode (not shown) is disposed to be opposed to the transparent glass substrate 43. Liquid crystals are sealed among the transparent glass substrate (not shown) equipped with the opposing electrode (not shown), the pixel electrode 37 and the second interlayer film 42 to form a liquid crystal display portion.

Referring to FIG. 3, the auxiliary capacitor Ccs for stabilizing the voltage is formed for each of the storage capacitor bus lines (horizontal Cs bus lines) 34 by utilizing the common storage capacitor bus line 35 which is for applying the predetermined potential (Cs potential) to the storage capacitor bus lines (horizontal Cs bus lines) 34.

Referring to FIG. 4B, a Ccs wiring (gate layer) 46 which serves as one electrode of the auxiliary capacitor Ccs is formed on the transparent glass substrate 43, the oxide film 45 is formed on the Ccs wiring (gate layer) 46, and the common storage capacitor bus line 35 is formed on the oxide film 45, thereby to form the auxiliary capacitor Ccs with the Ccs wiring (gate layer) 46 and the common storage capacitor bus line 35 being opposed to each other via the oxide film 45. The first interlayer film 39 is formed on the common storage capacitor bus line 35. On the first interlayer film 39, there is formed the vertical Ccs wiring (data layer) 47 for applying a predetermined potential to the Ccs wiring (gate layer) 46 that serves as one electrode of the auxiliary capacitor Ccs. The vertical Ccs wiring 47 is connected to the Ccs wiring 46 through the contact hole 90. Referring to FIG. 3, the vertical Ccs wiring 47 is arranged by the side of the common storage capacitor wiring 35 in parallel with the common storage capacitor wiring 35. The second interlayer film 42 is formed on the vertical Ccs wiring 47 and on the common storage capacitor wiring 35.

In the liquid crystal display panel 31 of the first embodiment as shown in FIG. 4B, the Ccs wiring 46 of the auxiliary capacitor Ccs on the common side is formed on the transparent glass substrate 43 by using the gate layer, and the wiring of the common storage capacitor bus line 35 is formed with the first interlayer film 39 sandwiched therebetween, thereby to form the auxiliary capacitor Ccs that is added to the common storage capacitor bus line 35. It is therefore allowed to add the auxiliary capacitor Ccs to the common storage capacitor bus line 35 without increasing the number of the steps for fabricating the liquid crystal display panel.

In order to further increase the capacitance of the auxiliary capacitor Ccs, the width of the common storage capacitor bus line 35 arranged in the vertical direction may be increased or the thickness of the first interlayer film 39 may be decreased. The common side of the auxiliary capacitor Ccs may be fixed to a predetermined potential. Therefore, there may be employed the same voltage as the power source voltage for the gate buffer or as that of the electrode (common electrode) opposing with the liquid crystals held therebetween.

Figure 6A:
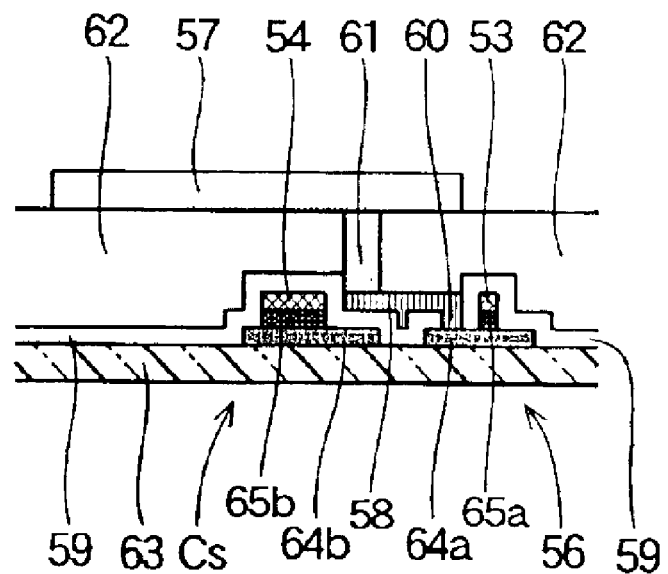
FIG. 6A is a sectional view of a pixel region (along the line C—C in FIG. 5)
Figure 6B:
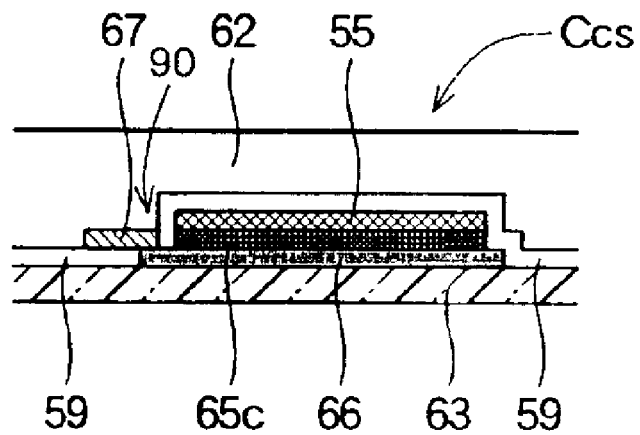
FIG. 6B is a sectional view of a capacitor portion (along the line D—D in FIG. 5) formed by utilizing the common storage capacitor bus line.

FIG. 5 is a diagram of a wiring constitution of major portions in the liquid crystal display panel according to a second embodiment of the invention, FIG. 6A is a sectional view of a pixel region (along the line C—C in FIG. 5), and FIG. 6B is a sectional view of a capacitor portion (along the line D—D in FIG. 5) formed by utilizing the common storage capacitor bus line.

In the liquid crystal display panel 51 according to the second embodiment as shown in FIG. 5, there are formed a plurality of gate bus lines 53 in parallel on the transparent glass substrate, and a plurality of data bus lines 52 intersecting thereto via an insulating film which is not shown. There are further formed a plurality of storage capacitor bus lines (horizontal Cs bus lines) 54 in parallel with the gate bus lines 53, and a common storage capacitor bus line (vertical Cs bus line) 55 in parallel with the data bus line 52.

TFTs 56 are arranged at positions near the points where the gate bus lines 53 intersect the data bus lines 52. The drain electrodes of the TFTs 56 are connected to the data bus lines 52, and the source electrodes of the TFTs 56 are connected to the data layers 58 and are further connected to the pixel electrodes (transparent electrodes) 57 through the data layers 58. Pixel electrodes (transparent electrodes) 57 are arranged in the regions defined by the gate bus lines 53 and by the data bus lines 52. The data layer 58 is extending near to the storage capacitor bus line (horizontal Cs bus line) 54.

In FIGS. 6A and 6B, a source region of a polysilicon layer 64a is connected to the source electrode of the TFT 56 through a contact hole 60 formed in the first interlayer film 59 (see FIG. 6A). Further, the data layer 58 is connected to the pixel electrode (transparent electrode) 57 through a contact hole 61 formed in a second interlayer film 62 (see FIG. 6A). The polysilicon layer 64 extending up to under the data bus line 52 is connected to the data bus line 52 through a contact hole 92 formed in the first interlayer film 59.

Referring to FIG. 6A, the pixel region is formed as described below. First, on the transparent glass substrate 63, there are formed a polysilicon layer 64a that serves as an operation semiconductor layer of the TFT 56 and a polysilicon layer 64b that serves as one electrode of the storage capacitor Cs. Then, oxide films 65a, 65b are formed on the polysilicon layers 64a, 64b, a gate bus line (gate layer) 53 is formed on the oxide film 65a thereby to form the TFT 56 and, at the same time, the storage capacitor bus line 54 is formed on the oxide film 65b. The storage capacitor Cs is formed as the polysilicon layer 64b and the storage capacitor bus line 54 are disposed opposing each other via the oxide film 65b. In FIG. 5, a region where the storage capacitor Cs is formed is surrounded by a dot-dash chain line. The region where the storage capacitor Cs is formed as surrounded by the dot-dash chain line is shown concerning a particular pixel only.

Referring next to FIG. 6A, the first interlayer film 59 is formed on the gate bus line 53 and on the storage capacitor bus line 54. Then, the first interlayer film 59 on the polysilicon layer 64a is opened to form the contact hole 60. Then, the data layer 58 is formed on the first interlayer film 59. The data layer 58 is formed on a region from the source electrode of the TFT 56 up to the storage capacitor bus line 54. Then, the second interlayer film 62 is formed on the data layer 58 and on the first interlayer film 59, and the second interlayer film 62 on the data layer 58 is opened to form the contact hole 61. The pixel electrode 57 is then formed on the second interlayer film 62.

A transparent glass substrate (not shown) equipped with an opposing electrode (not shown) is disposed to be opposed to the transparent glass substrate 63. Liquid crystals are sealed among the transparent glass substrate (not shown) equipped with the opposing electrode (not shown), the pixel electrode 57 and the second interlayer film 62 to form a liquid crystal display portion.

Referring to FIG. 5, the auxiliary capacitor Ccs for stabilizing the voltage is formed for each of the storage capacitor bus lines (horizontal Cs bus lines) 54 by utilizing the common storage capacitor bus line 55 which is for applying the predetermined potential (Cs potential) to the storage capacitor bus lines (horizontal Cs bus lines) 54.

Referring to FIG. 6B, a Ccs wiring (polysilicon layer) 66 which serves as one electrode of the auxiliary capacitor Ccs is formed on the transparent glass substrate 63, the oxide film 65c is formed on the Ccs wiring (polysilicon layer) 66, and the common storage capacitor bus line (vertical Cs bus line)(gate layer) 55 is formed on the oxide film 65c, thereby to form the auxiliary capacitor Ccs with the Ccs wiring (polysilicon layer) 66 and the common storage capacitor bus line 55 being opposed to each other via the oxide film 65c. The first interlayer film 59 is formed on the common storage capacitor bus line 55. On the first interlayer film 59, there is formed the vertical Ccs wiring (data layer) for applying a predetermined potential to the Ccs wiring (data layer) 66 that serves as one electrode (common electrode) of the auxiliary capacitor Ccs. The vertical Ccs wiring 67 is connected to the Ccs wiring 66 through the contact hole 90. Referring to FIG. 5, the vertical Ccs wiring (data layer) 67 is arranged by the side of the common storage capacitor wiring 55 in parallel with the common storage capacitor wiring 55. The second interlayer film 62 is formed on the vertical Ccs wiring 67 and on the common storage capacitor wiring 55.

In the liquid crystal display panel 51 of the second embodiment as shown in FIGS. 5 to 6B, the storage capacitors Cs of pixels and auxiliary capacitors Ccs added to the common storage capacitor bus line 55 are formed of MOS capacitors. Upon forming the MOS capacitors by the polysilicon layers 64b, 66, the capacitance per a unit area can be increased compared to that of when the capacitor is formed by the gate layer, interlayer film and data layer as is done in the first embodiment.

In the case of the MOS capacitor, the potential difference between the polysilicon layer and the gate layer must be greater than a predetermined voltage (about 3 volts). When the capacitance of the n-MOS structure is formed, therefore, a voltage higher than a maximum voltage of the pixel electrode must be applied. When the MOS capacitor (Ccs) added to the common storage capacitor bus line 55 is formed of the n-MOS capacitor, it becomes necessary to apply a voltage which is higher than the voltage (Vcs) applied to the storage capacitor bus lines (Cs bus lines). This constitution is the one based on the polysilicon process. The above constitution, however, is employed in the case of a single channel (n-MOS or p-MOS). In the case of amorphous silicon, the process is usually for the n-MOS only, and the same holds.

Figure 7:
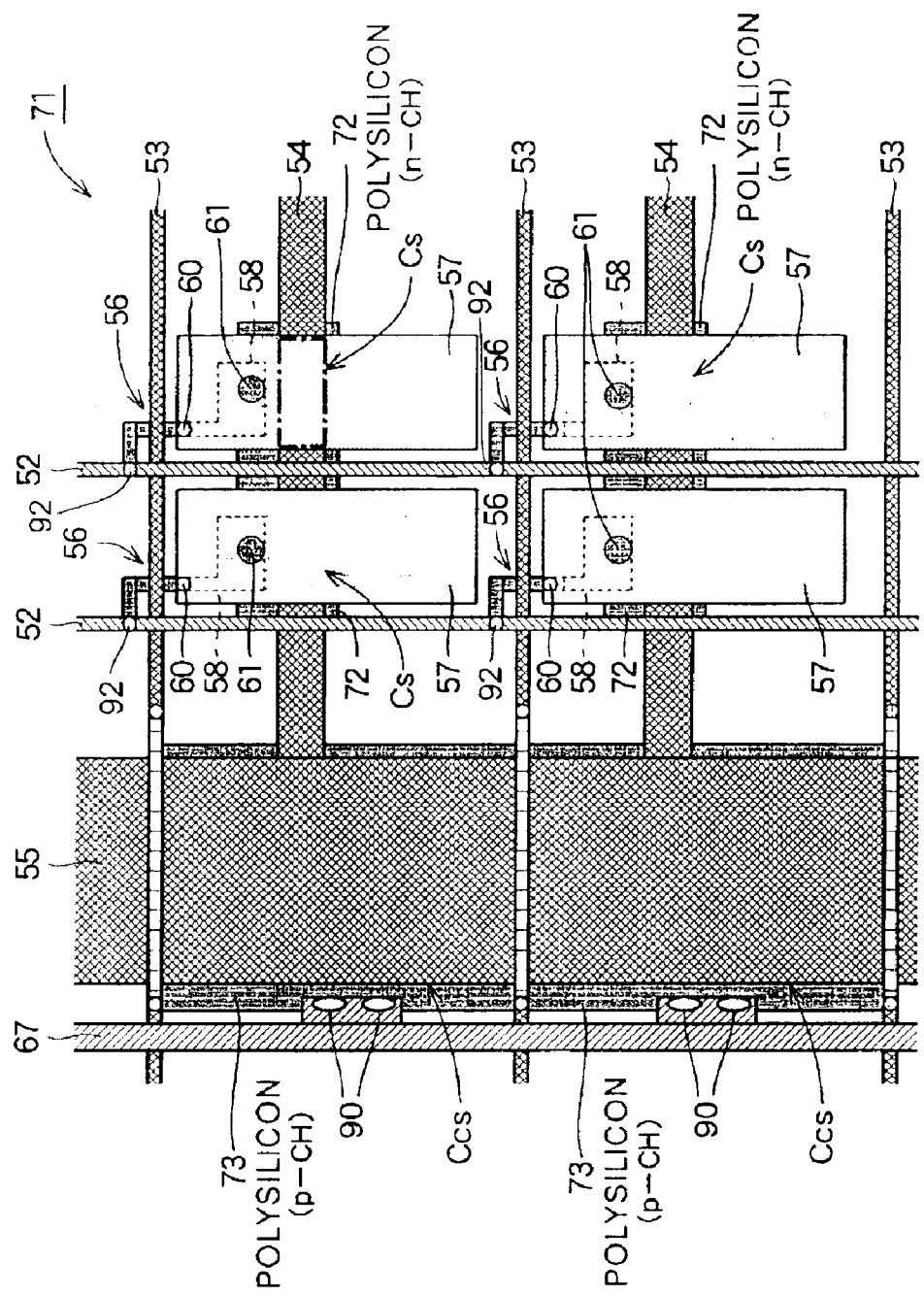
FIG. 7 is a diagram of a wiring constitution of major portions in the liquid crystal display panel according to a third embodiment of the invention.

FIG. 7 is a diagram of a wiring constitution of major portions in the liquid crystal display panel according to a third embodiment of the invention. In the liquid crystal display panel 71 shown in FIG. 7, the storage capacitor Cs of the pixel is formed of an MOS capacitor of n-CH (n-channel), and the auxiliary capacitor Ccs added to the common storage capacitor bus line (vertical Cs bus line) 67 is formed of an MOS capacitor of p-CH (p-channel). The wiring structure of the liquid crystal display panel 71 shown in FIG. 7 is almost the same as the wiring structure of the liquid crystal display panel 51 shown in FIG. 5 except that the polysilicon layer 72 which serves as one electrode of the storage capacitor Cs is formed of polysilicon of n-CH (n-channel) and the polysilicon layer 73 which serves as one electrode of the auxiliary capacitor Ccs added to the common storage capacitor bus line 67 is formed of polysilicon of p-CH (p-channel).

Upon forming the storage capacitor Cs in the n-MOS structure and forming, in the p-MOS structure, the auxiliary capacitor Ccs added to the common storage capacitor bus line 67 for applying a predetermined voltage to the storage capacitor Cs, the storage capacitor bus line voltage Vcs applied to the storage capacitor bus line (horizontal Cs bus line) 64 forming the other electrode of the storage capacitor Cs can be set to be a maximum voltage of the pixel electrode+about 3 volts, and the voltage Vccs applied to the common side of the auxiliary capacitors Ccs added to the common storage capacitor bus line 67 can be set to be the storage capacitor bus line voltage Vcs–about 3 volts. Therefore, the off-voltage of the gate can be used as the voltage Vccs to be applied to the common side of the auxiliary capacitors Ccs, offering such a merit that the power source wiring of the gate buffer can be used in common and the wiring region can be decreased.

Figure 8:
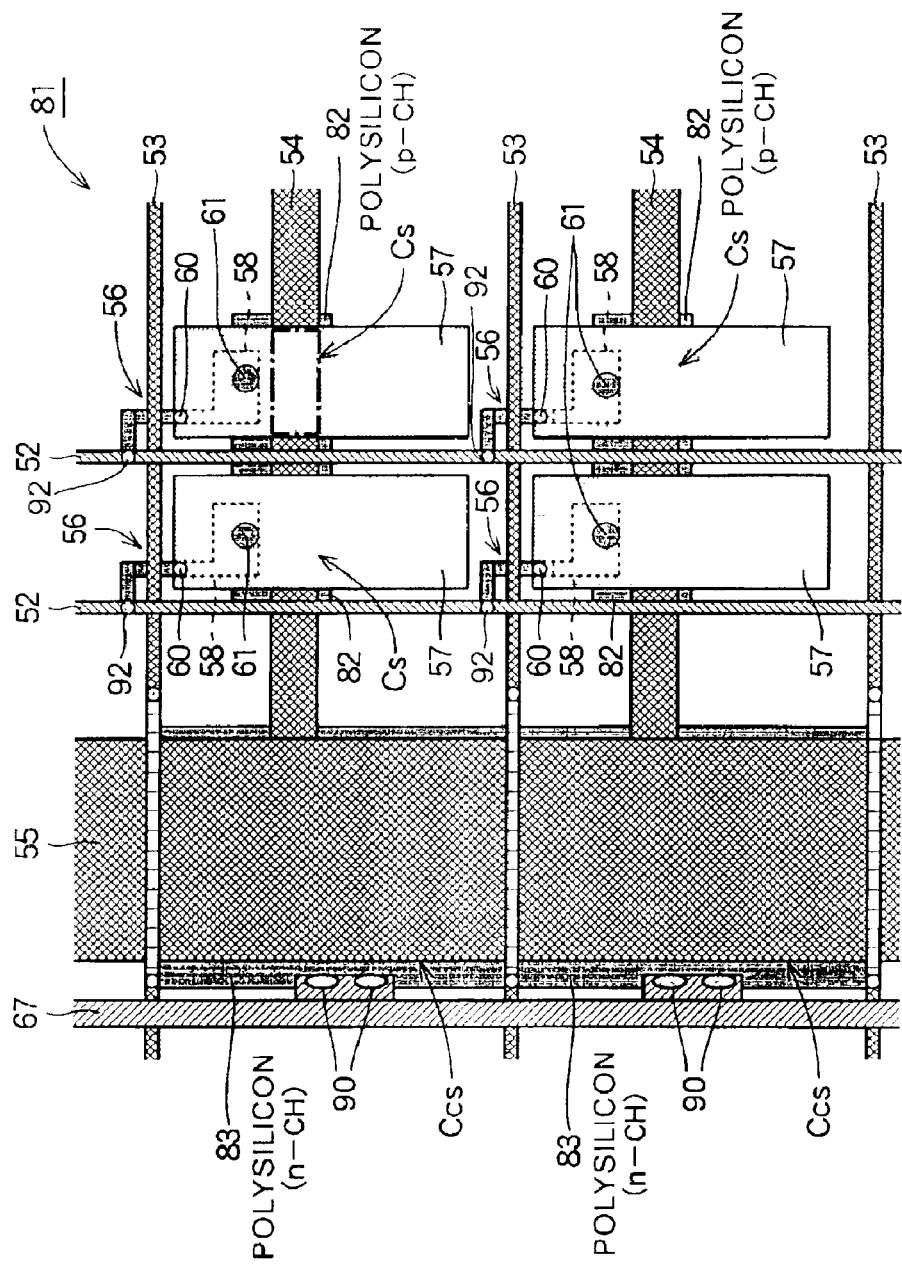
FIG. 8 is a diagram of a wiring constitution of major portions in the liquid crystal display panel according to the third embodiment of the invention.
Figure 9:
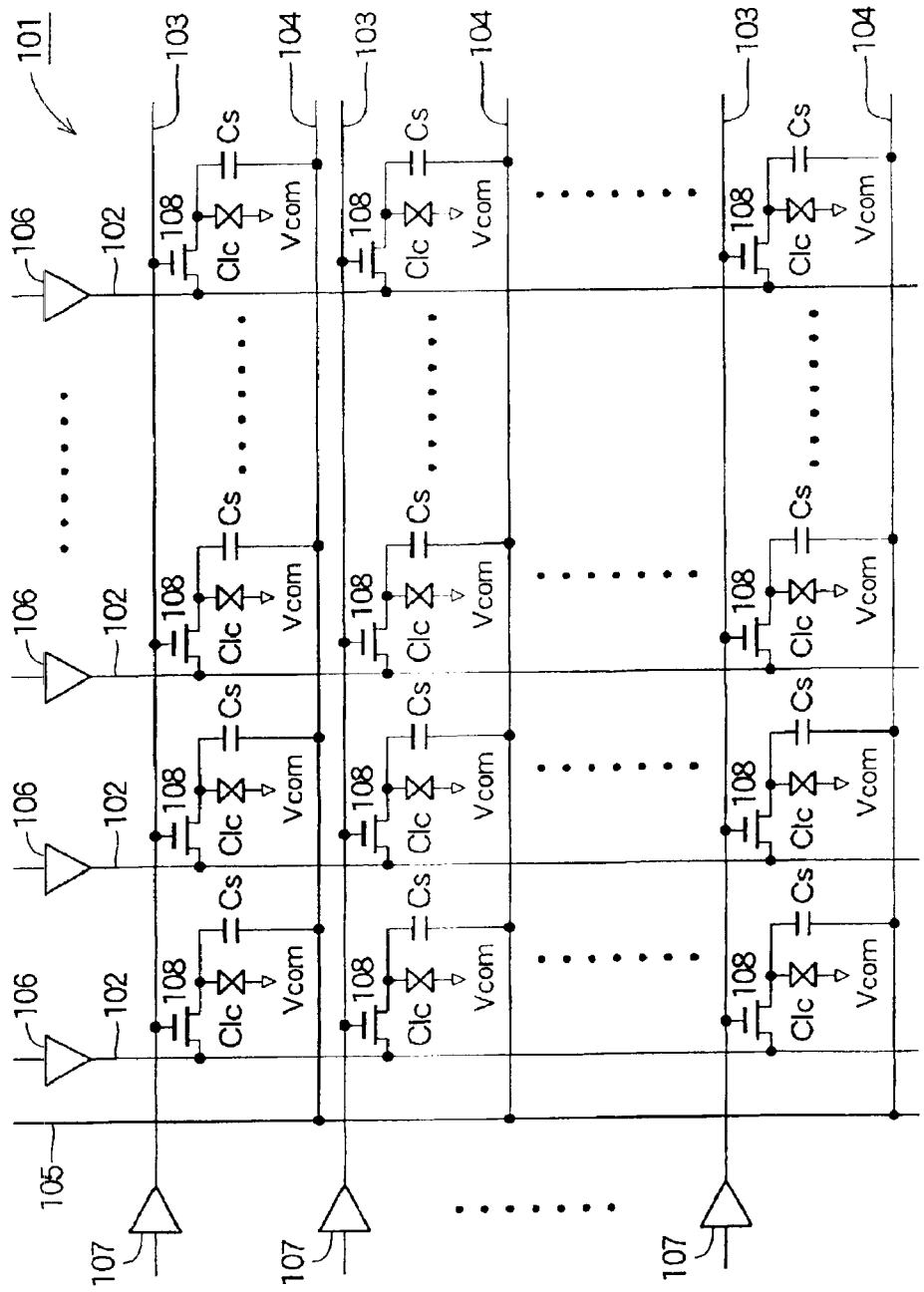
FIG. 9 is a diagram of an equivalent circuit of a conventional liquid crystal display panel.
Figure 10:
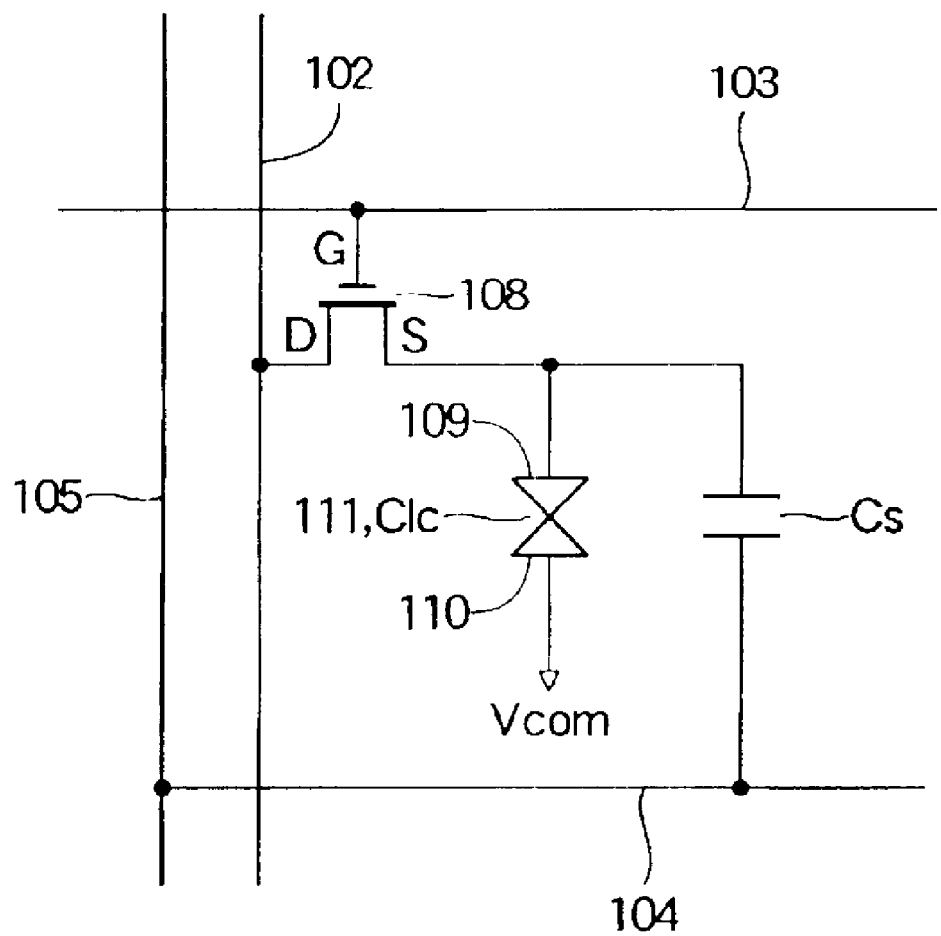
FIG. 10 is a diagram of an equivalent circuit of a display pixel in the conventional liquid crystal display panel.
Figures 11A, 11B:
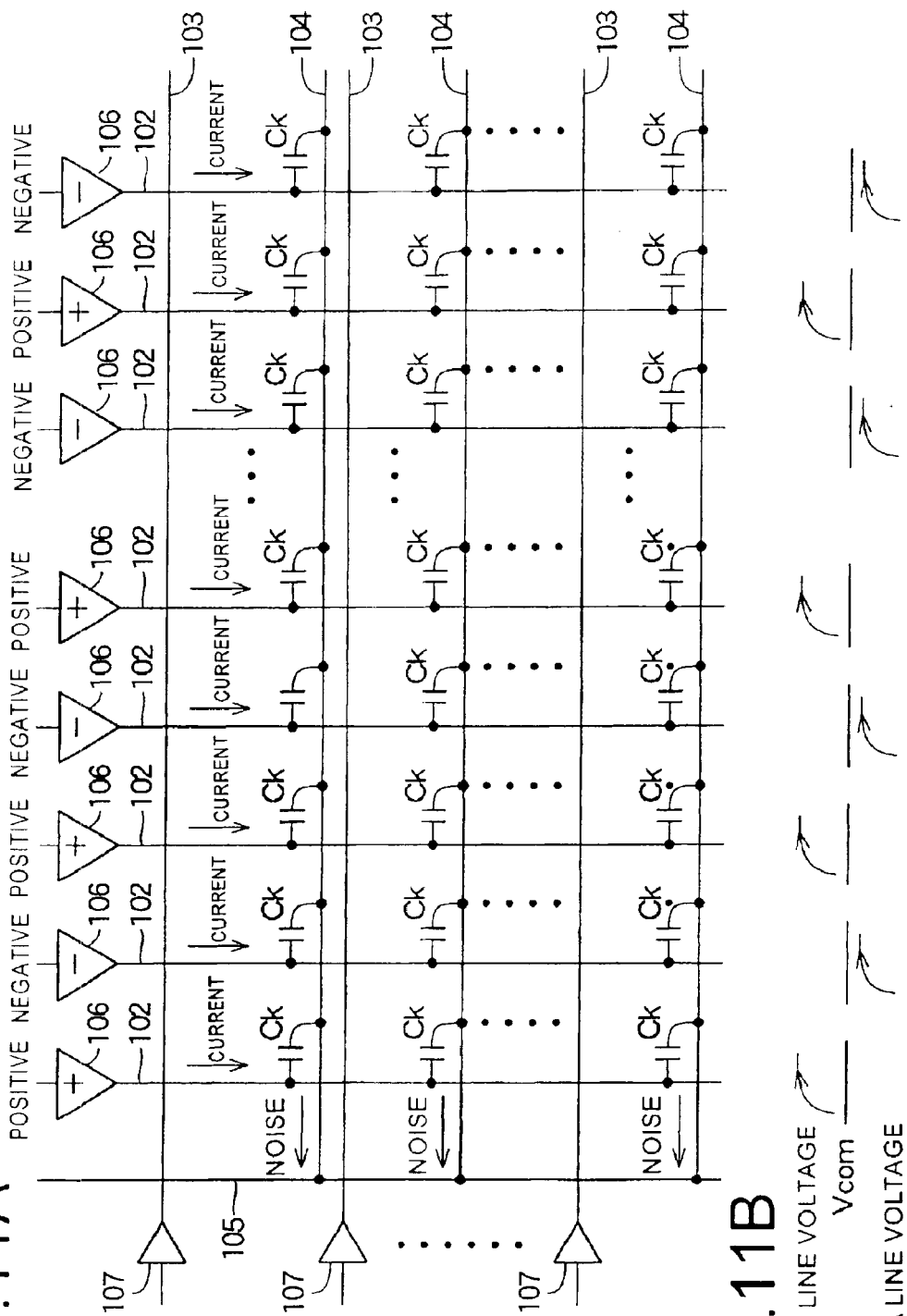

FIG. 8 is a diagram of a wiring constitution of major portions in the liquid crystal display panel according to the third embodiment of the invention. In the liquid crystal display panel 81 shown in FIG. 8, the storage capacitor Cs of the pixel is formed of an MOS capacitor of p-CH (p-channel), and the auxiliary capacitor Ccs added to the common storage capacitor bus line 67 is formed of an MOS capacitor of n-CH (n-channel). The wiring structure of the liquid crystal display panel 81 shown in FIG. 8 is almost the same as the wiring structure of the liquid crystal display panel 51 shown in FIG. 5 except that the polysilicon layer 82 which serves as one electrode of the storage capacitor Cs is formed of polysilicon of p-CH (p-channel) and the polysilicon layer 83 which serves as one electrode of the auxiliary capacitor Ccs added to the common storage capacitor bus line 67 is formed of polysilicon of n-CH (n-channel).

Upon forming the storage capacitor Cs in the p-MOS structure and forming, in the n-MOS structure, the auxiliary capacitor Ccs added to the common storage capacitor bus line 67 for applying a predetermined voltage to the storage capacitor Cs, there is obtained the same merit as that of the third embodiment.

Whether the storage capacitor Cs be formed in the n-MOS structure or in the p-MOS structure, or whether the auxiliary capacitor Ccs to be added be formed in the p-MOS structure or the n-MOS structure, is suitably determined relying upon the layout constitution such as the power source wiring.

By constituting the liquid crystal display device by using the liquid crystal display panel 31, 51, 71 or 81 of the first to fourth embodiments, it is allowed to suppress the fluctuation in the voltage of the storage capacitor bus lines (horizontal Cs bus lines) even when there is displayed a pattern which is likely to develop display unevenness or crosstalk as shown in, for example, FIG. 14. Therefore, there can be displayed images of a high quality without developing display unevenness or crosstalk.

Not being limited to the above embodiments only, the present invention can be modified in a variety of other ways.

In the above embodiments, for example, polysilicon layers 44 and 64a were used as the operation semiconductor layers of the TFTs 8, 36 and 56. Not being limited thereto only, however, there may be used the amorphous silicon layer as the operation semiconductor layer for the TFTs 8, 36 and 56.

As described above, the liquid crystal display panel of this invention is of the active matrix drive type in which each pixel is provided with an storage capacitor, and wherein auxiliary capacitors for stabilizing the voltage are added to the common storage capacitor bus line that applies a predetermined potential to the storage capacitor bus lines provided for each of the rows. Therefore, the auxiliary capacitors for stabilizing the voltage absorb noises mixed into the storage capacitor bus lines through parasitic capacitances formed at portions where the data bus lines intersect the storage capacitor bus lines. Further, even when the voltage of the storage capacitor bus lines has fluctuated accompanying a change in the signal voltage applied to the pixel electrodes, the fluctuation in the voltage can be absorbed by the auxiliary capacitors for stabilizing the voltage. Thus, the fluctuation in the voltage of the storage capacitor bus lines is suppressed, preventing the occurrence of display unevenness or crosstalk in the transverse direction, and presenting display of good quality.

When the storage capacitor of the pixel is formed in the MOS structure, the auxiliary capacitor for stabilizing voltage added to the common storage capacitor bus line is formed in the MOS structure, too, making it possible to further increase the auxiliary capacitor for stabilizing the voltage and to effectively suppress the fluctuation in the voltage of the storage capacitor bus lines. When the storage capacitor of the pixel is formed in the n-MOS structure, the auxiliary capacitor for stabilizing the voltage is formed in the p-MOS structure. When the storage capacitor of the pixel is formed in the p-MOS structure, the auxiliary capacitor for stabilizing the voltage is formed in the n-MOS structure. Therefore, the voltage applied to the common storage capacitor bus line can be used as the off-voltage or the on-voltage for the gate bus line. This eliminates the need of newly applying the voltage, and the circuit constitution and the structure of the liquid crystal display panel can be simplified.

What is claimed is:

1. A liquid crystal display panel comprising:

pixel regions arranged like a matrix on a substrate;

TFTs formed in the pixel regions;

storage capacitors formed in the pixel regions and having first ends connected to the TFTs;

storage capacitor bus lines connected to second ends of the plurality of the storage capacitors;

a common storage capacitor bus line connected to the storage capacitor bus lines for applying a first predetermined potential to the plurality of the storage capacitor bus lines; and auxiliary capacitors connected to the common storage capacitor bus line for stabilizing a voltage over the common storage capacitor bus line.

2. A liquid crystal display panel according to claim 1, wherein the auxiliary capacitors are formed by utilizing the common storage capacitor bus line.

3. A liquid crystal display panel according to claim 1, wherein the storage capacitors and the auxiliary capacitors are formed in an MOS structure.

4. A liquid crystal display panel according to claim 3, wherein the storage capacitors are formed in an n-MOS structure, and the auxiliary capacitors are formed in a p-MOS structure.

5. A liquid crystal display panel according to claim 3, wherein the storage capacitors are formed in a p-MOS structure, and the auxiliary capacitors are formed in an n-MOS structure.

6. A liquid crystal display panel according to claim 1, wherein the auxiliary capacitors include first ends connected to the common storage capacitor bus line and second ends connected to a second predetermine potential.

* * * * *

UNITED STATES PATENT AND TRADEMARK OFFICE
CERTIFICATE OF CORRECTION

PATENT NO. : 6,873,378 B2
DATED : March 29, 2005
INVENTOR(S) : Kai

It is certified that error appears in the above-identified patent and that said Letters Patent is hereby corrected as shown below:

Title page,
Item [57], ABSTRACT,
Line 17, delete "Ces" and insert -- Ccs -- therefore Signed and Sealed this Twenty-sixth Day of July, 2005

JON W. DUDAS
*Director of the United States Patent and Trademark Office*